United States Patent
Sharma et al.

(10) Patent No.: US 7,751,835 B2
(45) Date of Patent: Jul. 6, 2010

(54) NON-CIRCULAR PAGING AREAS

(75) Inventors: Vivek Sharma, Chelmsford, MA (US); Prasasth R. Palnati, Westford, MA (US); Rajeev Chawla, Lowell, MA (US); Arthur J. Barabell, Sudbury, MA (US); Champak Das, Bedford, MA (US)

(73) Assignee: Airvana, Inc., Chelmsford, MA (US)

( * ) Notice: Subject to any disclaimer, the term of this patent is extended or adjusted under 35 U.S.C. 154(b) by 462 days.

(21) Appl. No.: 11/243,405

(22) Filed: Oct. 4, 2005

(65) Prior Publication Data
US 2007/0077948 A1   Apr. 5, 2007

(51) Int. Cl.
H04W 68/00 (2009.01)
(52) U.S. Cl. ..................................... 455/458
(58) Field of Classification Search ........... 455/446, 455/450, 451, 452.1, 437, 458, 405, 67.6, 455/33.1, 33.2; 370/241, 254, 342, 13, 18, 370/60.1
See application file for complete search history.

(56) References Cited

U.S. PATENT DOCUMENTS

| | | | |
|---|---|---|---|
| 5,239,675 A | 8/1993 | Dudczak | |
| 5,377,224 A | 12/1994 | Hudson | |
| 5,754,945 A | 5/1998 | Lin et al. | |
| 5,790,528 A | 8/1998 | Muszynski | |
| 5,815,813 A | 9/1998 | Faruque | |
| 5,852,630 A | 12/1998 | Langberg et al. | |
| 5,857,154 A | 1/1999 | Laborde et al. | |
| 5,884,177 A | 3/1999 | Hanley | |
| 5,930,714 A | 7/1999 | Abu-Amara et al. | |
| 5,937,345 A | 8/1999 | McGowan et al. | |
| 5,940,762 A | 8/1999 | Lee et al. | |
| 5,960,349 A | 9/1999 | Chheda et al. | |
| 5,974,318 A | 10/1999 | Satarasinghe | |
| 5,983,282 A | 11/1999 | Yucebay | |
| 6,011,970 A | 1/2000 | McCarthy | |
| 6,014,564 A | 1/2000 | Donis et al. | |
| 6,016,429 A | 1/2000 | Khafizov et al. | |
| 6,023,625 A | 2/2000 | Myers et al. | |
| 6,032,033 A | 2/2000 | Morris et al. | |
| 6,047,186 A | 4/2000 | Yu et al. | |
| 6,049,715 A | 4/2000 | Willhoff et al. | |
| 6,052,594 A | 4/2000 | Chuang et al. | |
| 6,061,560 A | 5/2000 | Saboorian et al. | |
| 6,069,871 A | 5/2000 | Sharma et al. | |

(Continued)

FOREIGN PATENT DOCUMENTS

AU   1998/72855   12/1998

(Continued)

OTHER PUBLICATIONS

International Search Report mailed Oct. 29, 2002, in corresponding PCT application No. PCT/US2002/020380 (5 pages).

(Continued)

*Primary Examiner*—Melody Mehrpour
(74) *Attorney, Agent, or Firm*—Fish & Richardson P.C.

(57) ABSTRACT

In a radio access network, techniques for defining a non-circular paging area in which an access terminal is to be paged based on distance-based location updating information for a sector of the network.

31 Claims, 2 Drawing Sheets

U.S. PATENT DOCUMENTS

| | | | |
|---|---|---|---|
| 6,091,953 A | 7/2000 | Ho et al. | |
| 6,101,394 A | 8/2000 | Illidge | |
| 6,111,857 A * | 8/2000 | Soliman et al. | 370/254 |
| 6,112,089 A | 8/2000 | Satarasinghe | |
| 6,122,513 A | 9/2000 | Bassirat | |
| 6,151,512 A | 11/2000 | Chheda et al. | |
| 6,167,036 A | 12/2000 | Beven | |
| 6,178,328 B1 | 1/2001 | Tang et al. | |
| 6,192,246 B1 | 2/2001 | Satarasinghe | |
| 6,198,719 B1 | 3/2001 | Faruque et al. | |
| 6,198,910 B1 | 3/2001 | Hanley | |
| 6,208,615 B1 | 3/2001 | Faruque et al. | |
| 6,219,539 B1 | 4/2001 | Basu et al. | |
| 6,233,247 B1 | 5/2001 | Alami et al. | |
| 6,252,862 B1 | 6/2001 | Sauer et al. | |
| 6,256,300 B1 | 7/2001 | Ahmed et al. | |
| 6,266,529 B1 | 7/2001 | Chheda | |
| 6,272,148 B1 | 8/2001 | Takagi et al. | |
| 6,289,220 B1 | 9/2001 | Spear | |
| 6,320,898 B1 | 11/2001 | Newson et al. | |
| 6,345,185 B1 | 2/2002 | Yoon et al. | |
| 6,366,961 B1 | 4/2002 | Subbiah et al. | |
| 6,370,357 B1 | 4/2002 | Xiao et al. | |
| 6,370,381 B1 | 4/2002 | Minnick et al. | |
| 6,393,482 B1 | 5/2002 | Rai et al. | |
| 6,400,712 B1 | 6/2002 | Phillips | |
| 6,404,754 B1 | 6/2002 | Lim | |
| 6,408,182 B1 | 6/2002 | Davidson et al. | |
| 6,418,306 B1 | 7/2002 | McConnell | |
| 6,424,834 B1 | 7/2002 | Chang et al. | |
| 6,430,168 B1 | 8/2002 | Djurkovic et al. | |
| 6,438,376 B1 | 8/2002 | Elliott et al. | |
| 6,438,377 B1 | 8/2002 | Savolainen | |
| 6,445,922 B1 | 9/2002 | Hiller et al. | |
| 6,459,696 B1 | 10/2002 | Carpenter et al. | |
| 6,473,399 B1 | 10/2002 | Johansson et al. | |
| 6,477,159 B1 | 11/2002 | Yahagi | |
| 6,480,476 B1 | 11/2002 | Willars | |
| 6,480,718 B1 | 11/2002 | Tse | |
| 6,507,741 B1 | 1/2003 | Bassirat | |
| 6,522,885 B1 | 2/2003 | Tang et al. | |
| 6,539,030 B1 | 3/2003 | Bender et al. | |
| 6,542,481 B2 | 4/2003 | Foore et al. | |
| 6,542,752 B1 | 4/2003 | Illidge | |
| 6,545,984 B1 | 4/2003 | Simmons | |
| 6,580,699 B1 | 6/2003 | Manning et al. | |
| 6,590,879 B1 | 7/2003 | Huang et al. | |
| 6,611,695 B1 | 8/2003 | Periyalwar | |
| 6,618,585 B1 | 9/2003 | Robinson | |
| 6,621,811 B1 | 9/2003 | Chang et al. | |
| 6,628,637 B1 | 9/2003 | Li et al. | |
| 6,651,105 B1 | 11/2003 | Bhagwat et al. | |
| 6,687,237 B1 | 2/2004 | Lee et al. | |
| 6,701,148 B1 | 3/2004 | Wilson et al. | |
| 6,701,149 B1 | 3/2004 | Sen et al. | |
| 6,711,144 B1 | 3/2004 | Kim et al. | |
| 6,731,618 B1 | 5/2004 | Chung et al. | |
| 6,738,625 B1 | 5/2004 | Oom et al. | |
| 6,741,862 B2 | 5/2004 | Chung et al. | |
| 6,754,191 B1 | 6/2004 | Paranchych et al. | |
| 6,757,319 B1 | 6/2004 | Parsa et al. | |
| 6,768,903 B2 | 7/2004 | Fauconnier et al. | |
| 6,771,962 B2 | 8/2004 | Saifullah et al. | |
| 6,813,498 B1 | 11/2004 | Durga et al. | |
| 6,826,402 B1 | 11/2004 | Tran | |
| 6,834,050 B1 | 12/2004 | Madour et al. | |
| 6,842,630 B2 | 1/2005 | Periyalwar | |
| 6,847,821 B1 | 1/2005 | Lewis et al. | |
| 6,877,104 B1 | 4/2005 | Shimono | |
| 6,909,887 B2 | 6/2005 | Fauconnier et al. | |
| 6,944,452 B2 | 9/2005 | Coskun et al. | |
| 6,996,056 B2 | 2/2006 | Chheda et al. | |
| 6,999,784 B1 | 2/2006 | Choi | |
| 7,035,636 B1 | 4/2006 | Lim et al. | |
| 7,042,858 B1 | 5/2006 | Ma et al. | |
| 7,047,009 B2 | 5/2006 | Laroia et al. | |
| 7,072,663 B2 | 7/2006 | Ramos et al. | |
| 7,079,511 B2 | 7/2006 | Abrol et al. | |
| 7,085,251 B2 | 8/2006 | Rezaiifar | |
| 7,110,785 B2 | 9/2006 | Paranchych et al. | |
| 7,130,626 B2 | 10/2006 | Bender et al. | |
| 7,139,575 B1 | 11/2006 | Chen et al. | |
| 7,162,247 B2 | 1/2007 | Baba et al. | |
| 7,170,871 B2 | 1/2007 | Eyuboglu et al. | |
| 7,177,650 B1 * | 2/2007 | Reiger et al. | 455/453 |
| 7,200,391 B2 | 4/2007 | Chung et al. | |
| 7,212,822 B1 * | 5/2007 | Vicharelli et al. | 455/450 |
| 7,236,764 B2 | 6/2007 | Zhang et al. | |
| 7,242,958 B2 | 7/2007 | Chung et al. | |
| 7,251,491 B2 | 7/2007 | Jha | |
| 7,277,446 B1 | 10/2007 | Abi-Nassif et al. | |
| 7,298,327 B2 * | 11/2007 | Dupray et al. | 342/451 |
| 7,299,168 B2 * | 11/2007 | Rappaport et al. | 703/20 |
| 7,299,278 B2 | 11/2007 | Ch'ng | |
| 7,349,699 B1 | 3/2008 | Kelly et al. | |
| 7,398,087 B1 | 7/2008 | McConnell et al. | |
| 7,408,901 B1 | 8/2008 | Narayanabhatla | |
| 7,411,996 B2 | 8/2008 | Kim | |
| 7,453,912 B2 | 11/2008 | Laroia et al. | |
| 7,457,265 B2 | 11/2008 | Julka et al. | |
| 7,512,110 B2 | 3/2009 | Sayeedi et al. | |
| 7,546,124 B1 | 6/2009 | Tenneti et al. | |
| 2002/0025820 A1 | 2/2002 | Fauconnier et al. | |
| 2002/0031107 A1 | 3/2002 | Li et al. | |
| 2002/0032034 A1 | 3/2002 | Tiedemann, Jr. et al. | |
| 2002/0035699 A1 | 3/2002 | Crosbie | |
| 2002/0067707 A1 | 6/2002 | Morales et al. | |
| 2002/0068570 A1 | 6/2002 | Abrol et al. | |
| 2002/0082018 A1 | 6/2002 | Coskun et al. | |
| 2002/0085719 A1 | 7/2002 | Crosbie | |
| 2002/0102976 A1 | 8/2002 | Newbury et al. | |
| 2002/0136226 A1 | 9/2002 | Christoffel et al. | |
| 2002/0145990 A1 | 10/2002 | Sayeedi | |
| 2002/0193110 A1 | 12/2002 | Julka et al. | |
| 2002/0196749 A1 | 12/2002 | Eyuboglu et al. | |
| 2003/0438748 | 1/2003 | Zhang et al. | |
| 2003/0031201 A1 | 2/2003 | Choi | |
| 2003/0067970 A1 | 4/2003 | Kim | |
| 2003/0095513 A1 | 5/2003 | Woodmansee et al. | |
| 2003/0100311 A1 | 5/2003 | Chung et al. | |
| 2003/0469105 | 5/2003 | Zhang et al. | |
| 2003/0114162 A1 | 6/2003 | Chheda et al. | |
| 2003/0117948 A1 | 6/2003 | Ton et al. | |
| 2003/0125039 A1 | 7/2003 | Lachtar et al. | |
| 2003/0195016 A1 | 10/2003 | Periyalwar | |
| 2004/0008649 A1 | 1/2004 | Wybenga et al. | |
| 2004/0015607 A1 | 1/2004 | Bender et al. | |
| 2004/0038700 A1 | 2/2004 | Gibbs | |
| 2004/0068668 A1 | 4/2004 | Lor et al. | |
| 2004/0179492 A1 | 9/2004 | Zhang et al. | |
| 2004/0214574 A1 | 10/2004 | Eyuboglu et al. | |
| 2004/0224687 A1 | 11/2004 | Rajkotia | |
| 2005/0648187 | 1/2005 | Schmidt et al. | |
| 2005/0025116 A1 | 2/2005 | Chen et al. | |
| 2005/0111429 A1 | 5/2005 | Kim et al. | |
| 2005/0113117 A1 | 5/2005 | Bolin et al. | |
| 2005/0124343 A1 | 6/2005 | Kubo | |
| 2005/0148297 A1 | 7/2005 | Lu et al. | |
| 2005/0181795 A1 | 8/2005 | Mark et al. | |
| 2005/0207368 A1 | 9/2005 | Nam | |
| 2005/0213555 A1 | 9/2005 | Eyuboglu et al. | |
| 2005/0713958 | 9/2005 | Akhtar et al. | |
| 2005/0715281 | 9/2005 | Fong | |
| 2005/0233746 A1 | 10/2005 | Laroia et al. | |

| | | |
|---|---|---|
| 2005/0728848 | 10/2005 | Novak et al. |
| 2005/0243749 A1 | 11/2005 | Mehrabanzad et al. |
| 2005/0245279 A1 | 11/2005 | Mehrabanzad et al. |
| 2005/0751848 | 12/2005 | Fong |
| 2006/0758743 | 1/2006 | Novak et al. |
| 2006/0030323 A1 | 2/2006 | Ode et al. |
| 2006/0067422 A1 | 3/2006 | Chung |
| 2006/0067451 A1 | 3/2006 | Pollman et al. |
| 2006/0126509 A1 | 6/2006 | Abi-Nassif et al. |
| 2006/0126556 A1 | 6/2006 | Jiang et al. |
| 2006/0804343 | 6/2006 | Fong |
| 2006/0805670 | 6/2006 | Novak et al. |
| 2006/0159045 A1 | 7/2006 | Ananthaiyer et al. |
| 2006/0820683 | 7/2006 | Novak et al. |
| 2006/0820705 | 7/2006 | Novak et al. |
| 2006/0182063 A1 | 8/2006 | Jia et al. |
| 2006/0183497 A1 | 8/2006 | Paranchych et al. |
| 2006/0822018 | 8/2006 | Novak et al. |
| 2006/0209882 A1 | 9/2006 | Han et al. |
| 2006/0824848 | 9/2006 | Novak et al. |
| 2006/0825360 | 9/2006 | Novak et al. |
| 2006/0240782 A1 | 10/2006 | Pollman et al. |
| 2006/0828312 | 10/2006 | Novak et al. |
| 2006/0829426 | 10/2006 | Novak et al. |
| 2006/0264218 A1 | 11/2006 | Zhang et al. |
| 2006/0291420 A1 | 12/2006 | Ng |
| 2006/0294241 A1 | 12/2006 | Cherian et al. |
| 2007/0022396 A1 | 1/2007 | Attar et al. |
| 2007/0026884 A1 | 2/2007 | Rao |
| 2007/0058628 A1 | 3/2007 | Palnati et al. |
| 2007/0077948 A1 | 4/2007 | Sharma et al. |
| 2007/0097916 A1 | 5/2007 | Eyuboglu et al. |
| 2007/0105527 A1 | 5/2007 | Nylander et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0153750 A1 | 7/2007 | Baglin et al. |
| 2007/0155329 A1 | 7/2007 | Mehrabanzad et al. |
| 2007/0160008 A1 | 7/2007 | Burgess |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Sharma et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2008/0273493 A1 | 11/2008 | Fong et al. |
| 2008/0287130 A1 | 11/2008 | Laroia et al. |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0103494 A1 | 4/2009 | Jia et al. |
| 2009/0116445 A1 | 5/2009 | Samar et al. |
| 2009/0129334 A1 | 5/2009 | Fong et al. |
| 2009/0156218 A1 | 6/2009 | Garg et al. |

FOREIGN PATENT DOCUMENTS

| | | |
|---|---|---|
| AU | 1998/84574 | 2/1999 |
| AU | 2001/21976 | 6/2001 |
| AU | 735575 | 7/2001 |
| AU | 2003/202721 | 10/2003 |
| CA | 2295922 | 3/2004 |
| CN | 1265253 | 8/2000 |
| CN | 1653844 | 10/2004 |
| CN | 101015224 A | 8/2007 |
| EP | 625863 | 11/1994 |
| EP | 0904369 | 3/1999 |
| EP | 983694 | 3/2000 |
| EP | 983705 | 3/2000 |
| EP | 995278 | 4/2000 |
| EP | 995296 | 4/2000 |
| EP | 1005245 | 5/2000 |
| EP | 1011283 | 6/2000 |
| EP | 1014107 | 6/2000 |
| EP | 1397929 | 3/2004 |
| EP | 1491065 | 12/2004 |
| EP | 1751998 | 2/2007 |
| EP | 1896980 | 3/2008 |
| EP | 1897383 | 3/2008 |
| GB | 2447585 | 8/2008 |
| GB | 2452688 | 3/2009 |
| HK | 1101334 A | 10/2007 |
| JP | 2007-538476 | 12/2007 |
| JP | 2008-547329 | 12/2008 |
| JP | 2008-547358 | 12/2008 |
| KR | 9833373 | 8/1998 |
| KR | 2004/046069 | 6/2004 |
| KR | 2004/089744 | 10/2004 |
| KR | 787289 | 12/2007 |
| MX | 1999/10613 | 3/2002 |
| WO | WO9748191 | 12/1997 |
| WO | WO 98/08353 | 2/1998 |
| WO | WO 98/09460 | 3/1998 |
| WO | WO98/53618 | 11/1998 |
| WO | WO98/53620 | 11/1998 |
| WO | WO99/03245 | 1/1999 |
| WO | WO99/04511 | 1/1999 |
| WO | WO00/60891 | 10/2000 |
| WO | WO01/45308 | 6/2001 |
| WO | W002/071633 | 9/2002 |
| WO | W002/071652 | 9/2002 |
| WO | WO03/001820 | 1/2003 |
| WO | WO03/009576 | 1/2003 |
| WO | WO03/081938 | 10/2003 |
| WO | WO2004/64434 | 7/2004 |
| WO | WO2005/12520 | 12/2005 |
| WO | WO2005/115026 | 12/2005 |
| WO | WO2006/81527 | 8/2006 |
| WO | WO2007/002659 | 1/2007 |
| WO | WO2007/28122 | 3/2007 |
| WO | WO2007/28252 | 3/2007 |
| WO | WO2007/044099 | 4/2007 |
| WO | WO2007/45101 | 4/2007 |
| WO | WO 2007/075446 | 7/2007 |
| WO | WO 2007/078766 | 7/2007 |

OTHER PUBLICATIONS

International Search Report and Written Opinion mailed Oct. 26, 2006, in corresponding PCT application No. PCT/US2005/17385 (14 pages).

International Search Report and Written Opinion mailed Apr. 26, 2007, in corresponding PCT application No. PCT/US2006/24958 (10 pages).

*International Preliminary Report on Patentability* for Application No. PCT/US2005/017385, Dec. 7, 2006, 8 pages.

*International Preliminary Report on Patentability* for Application No. PCT/US2006/024958, Jan. 17, 2008, 7 pages.
*EP Examination Report* for Application No. 06785637.7, Feb. 6, 2008, 2 pages.
U.S. Appl. No. 09/891,103, filed Jun. 25, 2001, including application as filed, transaction history from PAIR (PTO website), and pending claims.
PCT application No. PCT/US2002/020380 filed on Jun. 25, 2002, with Publication No. WO2003/001820, including application as filed, transaction history from PAIR (PTO website).
U.S. Appl. No. 11/640,619, filed Dec. 18, 2006, including application as filed, transaction history from PAIR (PTO website).
PCT application No. PCT/US2005/17385 filed on May 17, 2005, with Publication No. WO2005/115026, including application as filed, transaction history from PAIR (PTO website).
U.S. Appl. No. 11/037,896, filed Jan. 18, 2005, including application as filed, transaction history from PAIR (PTO website), and pending claims.
U.S. Appl. No. 11/167,785, filed Jun. 27, 2005, including application as filed, transaction history from PAIR (PTO website), and pending claims.
PCT application No. PCT/US2006/24958 filed on Jun. 27, 2006, with Publication No. WO2007/002659, including application as filed, transaction history from PAIR (PTO website).
U.S. Appl. No. 11/303,773, filed Dec. 16, 2005, including application as filed, transaction history from PAIR (PTO website), and pending claims.
U.S. Appl. No. 11/305,286, filed Dec. 16, 2005, including application as filed, transaction history from PAIR (PTO website).
PCT application No. PCT/US2006/47524 filed on Dec. 13, 2006, with Publication No. WO2007/078766, including application as filed, transaction history from PAIR (PTO website).
U.S. Appl. No. 11/303,774, filed Dec. 16, 2005, including application as filed, transaction history from PAIR (PTO website), and pending claims.
PCT application No. PCT/US2006/47963 filed on Dec. 15, 2006, with Publication No. WO2007/075446, including application as filed, transaction history from PAIR (PTO website).
U.S. Appl. No. 11/955,644, filed Dec. 13, 2007, including application as filed, transaction history from PAIR (PTO website).
Paul Bender, et al., "CDMA/HDR: A Bandwidth-Efficient High-Speed Wireless Data Service for Nomadic Users", IEEE Communications Magazine, Jul. 2000.
Paul Bender & Ramin Rezalifar, "Draft Baseline Text for the 1xEV-DO Upper Layers (excluding Physical Layer)", 3GPP2, Aug. 17, 2000.
3GPP2, "3GPP2 Access Network Interfaces Interoperability Specification 2, Release A," Jun. 2000.
TIA/EIA/TSB-115, "Wireless IP Architecture Based on IETF Protocols", Jun. 6, 2000.
3GPP2, "Wireless IP Network Standard", 3rd Generation Partnership Project 2 (3GPP2), Version 1.0.0, Jul. 14, 2000.
Goran Janevski, "IP-Based Mobile Wireless Access Network Architecture", Nortel Networks- MWIF Contribution, Draft dated Sep. 7, 2000.
International Search Report and Written Opinion for PCT international application No. PCT/US2006/25018, mailed Jan. 29, 2008 (11 pages).
International Preliminary Report on Patentability for Application No. PCT/US2006/25018, Mar. 19, 2009 (8 pages).
International Preliminary Report on Patentability for PCT international application No. PCT/US2006/047963, mailed Dec. 11, 2008 (5 pages).
International Search Report and Written Opinion for PCT international application No. PCT/US2006/047963, mailed Sep. 26, 2008 (9 pages).
International Search Report and Written Opinion for PCT international application No. PCT/US2006/047524, mailed May 26, 2009 (13 pages).
U.S. Appl. No. 10/848,597, filed May 18, 2004, now U.S. Patent No. 7,170,871, issued Jan. 30, 2007, including application as filed, transaction history from PAIR (PTO website).
U.S. Appl. No. 11/166,893, filed Jun. 24, 2005, including application as filed, transaction history from PAIR (PTO website), and pending claims.
PCT application No. PCT/US2006/025018 filed on Jun. 26, 2006, with Publication No. WO2007/044099, including application as filed, transaction history from PAIR (PTO website).
U.S. Appl. No. 11/402,744, filed Apr. 12, 2006, including application as filed, transaction history from PAIR (PTO website), and pending claims.
3rd Generation Partnership Project "3GPP2", cdma2000 High Rate Packet Data Interface Specification, C.S0024-A, version 4.0, Oct. 25, 2002.
3rd Generation Partnership Project "3GPP2", cdma2000 High Rate Packet Data Interface Specification, C.S0024-A, version 1.0, Mar. 2004.
3rd Generation Partnership Project "3GPP2", cdma2000 High Rate Packet Data Interface Specification, C.S0024-A, version 2.0, Jul. 2005.
3rd Generation Partnership Project "3GPP2", cdma2000 High Rate Packet Data Interface Specification, C.S0024-B, version 1.0, Apr. 2006.
Rashid Attar et al., "Evolution of cdma2000 Cellular Networks: Multicarrier EV-DO", IEEE Communications Magazine, Mar. 2006. pp. 46-53.
Chinese Office action of Chinese application No. 200580024230.0 mailed Mar. 15, 2009 (13 pages).
EP Examination Report for Application No. 05750705.5, Jan. 9, 2007 (2 pages).
TIA/EIA/IS-2001, Interoperability Specification (IOS) for CDMA2000 Network Access Interfaces, Aug. 2001 (revised version of May 2000).
Office action and response history of U.S. Appl. No. 09/891,103 to May 27, 2009.
Office action and response history of U.S. Appl. No. 10/848,597 to May 18, 2004.
Office action and response history of U.S. Appl. No. 11/166,893 to May 27, 2009.
Office action and response history of U.S. Appl. No. 11/037,896 to May 27, 2009.
Office action and response history of U.S. Appl. No. 11/167,785 to May 27, 2009.
Office action and response history of U.S. Appl. No. 11/303,773 to May 27, 2009.
Office action and response history of U.S. Appl. No. 11/305,286 to Jun. 1, 2009.
Office action and response history of U.S. Appl. No. 11/303,774 to May 27, 2009.
Office action and response history of U.S. Appl. No. 11/402,744 to May 27, 2009.
Office action and response history of U.S. Appl. No. 11/955,644 to May 27, 2009.
Office action and response history of U.S. Appl. No. 11/167,785 to Sep. 22, 2009.
Office action and response history of U.S. Appl. No. 11/305,286 to Sep. 30, 2009.
Office action and response history of U.S. Appl. No. 11/640,619 to Nov. 9, 2009.
Office action and response history of U.S. Appl. No. 09/891,103 to Nov. 10, 2009.
Office action and response history of U.S. Appl. No. 11/303,773 to Nov. 20, 2009.
Office action and response history of U.S. Appl. No. 11/402,744 to Nov. 30, 2009.
Chinese Office action of Chinese application No. 200580024230.0 mailed Nov. 20, 2009 (4 pages).
Office action and response history of U.S. Appl. No. 11/166,893 to Dec. 8, 2009.
Office action and response history of U.S. Appl. No. 09/891,103 to Dec. 8, 2009.
Office action and response history of U.S. Appl. No. 11/037,896 to Dec. 8, 2009.
Office action and response history of U.S. Appl. No. 11/486,545 to Dec. 8, 2009.

Office action and response history of U.S. Appl. No. 11/955,644 to Dec. 8, 2009.
Office action of U.S. Appl. No. 11/303,774 dated Jun. 12, 2009.
Office Action and response from European Patent Office for Application No. 06836082.5 mailed Jun. 18, 2009 and sent Jul. 21, 2009 (21 pages).
Chinese Office action response of Chinese application No. 200580024230.0 sent Jul. 22, 2009 (8 pages).
Office action and response history of U.S. Appl. No. 11/166,893 to Aug. 11, 2009.
Office action and response history of U.S. Appl. No. 11/955,644 to Aug. 11, 2009.
Office action and response history of U.S. Appl. No. 09/891,103 to Aug. 11, 2009.
Office action and response history of U.S. Appl. No. 11/167,785 to Aug. 11, 2009.
Office action and response history of U.S. Appl. No. 11/305,286 to Aug. 11, 2008.
Office action and response history of U.S. Appl. No. 11/303,774 to Aug. 13, 2009.
Office action and response history of U.S. Appl. No. 11/303,773 to Aug. 13, 2009.
U.S. Appl. No. 09/217,064, filed Dec. 21, 1998, Xia et al.
U.S. Appl. No. 09/213,523, filed Dec. 17, 1998, Simmons.
U.S. Appl. No. 09/198,387, filed Nov. 24, 1998, Bevan.
U.S. Appl. No. 09/036,191, filed Mar. 6, 1998, Sharma et al.
U.S. Appl. No. 08/859,197, filed May 20, 1997, Chheda et al.
U.S. Appl. No. 60/019,459, filed Jun. 13, 1996, Graves et al.
U.S. Appl. No. 08/057,970, filed May 7, 1993, Willhoff et al.
Australian (AU) Examination Report for Application No. 2005426813, Jun. 4, 2009 (18 pages).
Office action and response history of U.S. Appl. No. 11/402,744 to Aug. 17, 2009.
Office action and response history of U.S. Appl. No. 11/486,545 to Aug. 26, 2009.
3rd Generation Partnership Project 2 "3GPP2", "cdma2000 High Rate Packet Data Interface Specification", C.S0024, version 2, Oct. 27, 2000 (441 pages).
3rd Generation Partnership Project 2 "3GPP2", "cdma2000 High Rate Packet Data Interface Specification", C.S0024-B, version 2, Mar. 2007 (1627 pages).
Library Search for Nortel and frequency handoff. Search results dated Aug. 28, 2009 (85 pages).
Office action and response history of U.S. Appl. No. 11/037,896 to Sep. 17, 2009.
Office action and response history of U.S. Appl. No. 11/303,774 to Sep. 17, 2009.

* cited by examiner

NON-CIRCULAR PAGING AREAS

TECHNICAL FIELD

This description relates to non-circular paging areas.

BACKGROUND

High Data Rate (HDR) is an emerging mobile wireless access technology that enables personal broadband Internet services to be accessed anywhere, anytime (see P. Bender, et al., "CDMA/HDR: A Bandwidth-Efficient High-Speed Wireless Data Service for Nomadic Users", IEEE Communications Magazine, July 2000, and 3GPP2, "Draft Baseline Text for 1xEV-DO," Aug. 21, 2000). Developed by Qualcomm, HDR is an air interface optimized for Internet Protocol (IP) packet data services that can deliver a shared forward link transmission rate of up to 2.46 Mbit/s per sector using only (1X) 1.25 MHz of spectrum. Compatible with CDMA2000 radio access (TIA/EIA/IS-2001, "Interoperability Specification (IOS) for CDMA2000 Network Access Interfaces," May 2000) and wireless IP network interfaces (TIA/EIA/TSB-115, "Wireless IP Architecture Based on IETF Protocols," Jun. 6, 2000, and TIA/EIA/IS-835, "Wireless IP Network Standard," 3rd Generation Partnership Project 2 (3GPP2), Version 1.0, Jul. 14, 2000), HDR networks can be built entirely on IP technologies, all the way from the mobile Access Terminal (AT) to the global Internet, thus taking full advantage of the scalability, redundancy and low-cost of IP networks.

An EVolution of the current 1xRTT standard for high-speed data-only (DO) services, also known as the 1xEV-DO protocol has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 1.0, March 2004, Ballot Resolution, but has yet not been adopted. Revision A is also incorporated herein by reference.

A 1xEV-DO radio access network (RAN) includes access terminals in communication with radio nodes over airlinks. Each access terminal may be a laptop computer, a Personal Digital Assistant (PDA), a dual-mode voice/data handset, or another device, with built-in 1xEV-DO support. The radio nodes are connected to radio node controllers over a backhaul network that can be implemented using a shared IP or metropolitan Ethernet network which supports many-to-many connectivity between the radio nodes and the radio node controllers. The radio access network also includes a packet data serving node, which is a wireless edge router that connects the radio access network to the Internet.

Typically, each radio node controller controls 25-100 radio nodes and each radio node supports 1-4 carriers each of 1.25 MHz of bandwidth. The geographic area of the radio access network that is served by any given radio node is referred to as a cell. Each cell can be divided into multiple sectors (typically 3 or 6).

Access terminals in a 1xEV-DO radio access network periodically send route update messages to the network. Each route update message identifies the sectors that are "visible" to the access terminal. The sector identification enables the radio access network to keep track of the access terminal's approximate location within the footprint of the network and to maintain the airlink as the access terminal moves between the coverage areas of different sectors.

When the radio access network has to page an access terminal to notify it of an incoming call, the network selects a set of sectors to page the terminal on.

One selection method known as "flood paging" involves selecting all of the sectors in the radio access network. The flood paging method covers a large paging area often at significant expense cost-wise.

Another selection method known as "selective paging" involves selecting a subset of the sectors in the radio access network. In one example, the radio access network reduces the size of the paging area by selecting only those sectors that are within a specified distance (referred to in the IS-856 specification as a "RouteUpdateRadius" or "RUR") of the sector ("paging reference sector") from which the access terminal last sent a route update message. The shape of such a paging area is a circle on the surface of the earth, in which the paging reference sector's longitude and latitude co-ordinates represents the center of the circle and the specified distance or the RUR represents the radius of the circle. To determine whether a sector ("sector under test") in the network is within a circular paging area of a paging reference sector, the radio access network uses the following formula provided in the IS-856 to calculate the distance r between the paging reference sector and the sector under test:

$$r = \left[ \frac{\sqrt{\left[(x_c - x_L) \times \cos\left(\frac{\pi}{180} \times \frac{y_L}{14400}\right)\right]^2 + [y_c - y_L]^2}}{16} \right]$$

where $(x_C, y_C)$ represents the longitude and latitude co-ordinates of the paging reference sector, and $(x_L, y_L)$ represents the longitude and latitude co-ordinates of the sector under test. If the computed value of r is less than RUR, the sector under test is inside the circular paging area and is selected by the radio access network for use in paging the access terminal for an incoming call.

In certain cases, each of the sectors identified by an access terminal in its route update message can be considered a paging reference sector that contributes its own paging area. At the time of paging, a radio access network that uses the above-identified formula to determine whether an individual sector under test is within a paging area of a given paging reference sector has to perform a series of calculations per paging reference sector to identify all of the sectors that are within a union of the paging areas associated with the multiple paging reference sectors. In certain cases in which an identified sector is within the paging areas of more than one paging reference sector, an access terminal may be paged multiple times by a single sector.

To avoid having to do the processing intensive calculations associated with the above-identified formula on-the-fly at the time of paging, the network may pre-determine and store the sectors to be paged for each sector that can be a paging reference sector. In a distributed system (e.g., a multi-chassis system), updates to such stored information resulting from changes to the set of sectors can be costly and vulnerable to card failures.

SUMMARY

In one aspect, the invention features a method that enables a radio access network to define a non-circular paging area in which an access terminal is to be paged based on distance-based location updating information for a sector of the network.

Implementations of the invention may include one or more of the following. The distance-based location updating information includes a location value and a distance value associated with the sector. The method of enabling includes defining a circle having a center corresponding to the location value and a radius corresponding to the distance value, and defining, for the sector, a non-circular paging area that encompasses at least the circle. The location value includes a longitude co-ordinate and a latitude co-ordinate. The distance value represents a distance from the location value. The non-circular paging area has a size that is based on the distance value associated with the sector.

The method can include receiving a route update message from the access terminal, and based on the received route update message, identifying a sector of the network as being a paging reference sector. The method can further include retrieving, from a data store, information defining the non-circular paging area of the paging reference sector, identifying each sector of the network that is within the non-circular paging area of the paging reference sector, and sending a paging message to each identified sector so as to initiate a page of the access terminal by the identified sector.

The method can include maintaining location value information for sectors of the network. The location values for the sectors can be maintained in a list that is ordered along longitude and latitude values.

The method can include receiving a route update message from the access terminal, and based on the received route update message, identifying sectors of the network as being paging reference sectors. The method can further include retrieving, from a data store, information defining the non-circular paging area of each paging reference sector, generating a non-circular super paging area of the paging reference sectors, the non-circular super paging area including a union of the retrieved non-circular paging areas, identifying each sector of the network that is within the non-circular super paging area of the paging reference sectors, and sending a paging message to each identified sector so as to initiate a page of the access terminal by the identified sector.

The non-circular paging area can be defined by a set of values, each representing a side or corner co-ordinate of the non-circular paging area. The non-circular paging area can be a square-shaped paging area or a rectangular-shaped paging area. The non-circular paging area can be defined based on a curvature of the surface of the earth.

In another aspect, the invention features a machine-readable medium that stores executable instructions for use at a radio node controller of a radio access network, the instructions causing a machine to define a non-circular paging area in which an access terminal is to be paged based on distance-based location updating information for a sector of the network.

Implementations of the invention may include one or more of the following. The machine-readable medium may further include instructions to cause the machine to designate a sector of the network as being a paging reference sector, identify sectors of the network that are within a non-circular paging area of the paging reference sector, and send a paging message to each identified sector so as to initiate a page of the access terminal by the identified sector. The machine-readable medium may further include instructions to cause the machine to designate sectors of the network each as being a paging reference sector, identify sectors of the network that are within a non-circular super paging area of the paging reference sectors, and send a paging message to each identified sector so as to initiate a page of the access terminal by the identified sector.

In another aspect, the invention features a method that includes paging an access terminal from a radio access network in sectors that are selected as lying within a non-circular paging area.

In another aspect, the invention features a method that includes selecting sectors of a paging area in which to page an access terminal from a radio access network, the selection being made at the time of the paging without requiring pre-selection of the sectors.

In another aspect, the invention features a method that includes selecting sectors of a paging area in which to page an access terminal using a comparison of positional values of sectors within boundaries of the paging area.

In other aspects, corresponding computer programs and apparatus are also provided.

Advantages that can be seen in particular implementations of the invention include one or more of the following. The radio access network can pre-calculate and store the non-circular paging area information (e.g., the co-ordinates of the corners of a square-shaped paging area) on a per-sector basis rather than dynamically determine the non-circular paging area on-the-fly at the time of paging, a process that can be processing intensive. When multiple paging reference sectors are identified for an access terminal, the selective paging techniques efficiently combine the non-circular paging areas associated with the respective paging reference sectors to form a super paging area that can be used for determining whether a given sector is to be included in the set of sectors on which the access terminal is paged. The provision of a super paging area allows the network to quickly identify a sector that is within the paging areas of multiple paging reference sectors and eliminate the duplicates so that the access terminal is only paged once via that sector. The selective paging techniques increase the paging capacity of the network through a highly cost effective mechanism as compared to the flood paging techniques. The calculations and comparisons associated with the selective paging techniques are not processing intensive, thus enabling fewer or less costly resource to be used in performing the techniques. The selective paging techniques also enable a distributed system, such as a multi-chassis system, to be more fault tolerant to events, for example, card failures.

The details of one or more examples are set forth in the accompanying drawings and the description below. Further features, aspects, and advantages of the invention will become apparent from the description, the drawings, and the claims.

DETAILED DESCRIPTION

Figure 1:
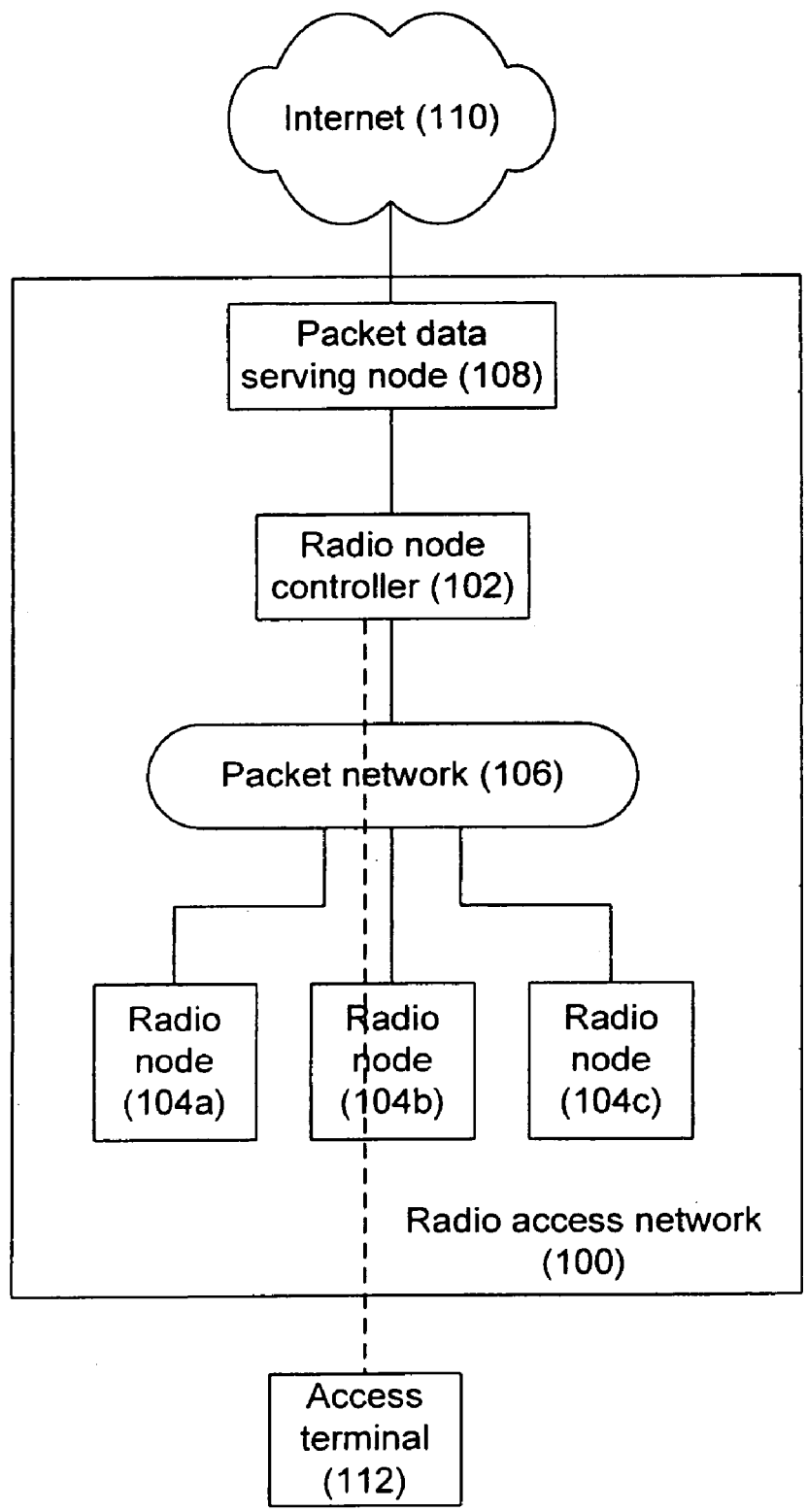
FIG. 1 shows a radio access network.

FIG. 1 shows a 1xEV-DO radio access network 100 with a radio node controller 102 connected to three radio nodes 104*a*-104*c* over a packet network 106. The packet network 106 can be implemented as an IP-based network that supports many-to-many connectivity between the radio nodes 104*a*-104*c* and the radio node controller 102. The packet network 106 is connected to the Internet 110 via a packet data serving node 108. Other radio nodes, radio node controllers, and packet networks (not shown in FIG. 1) can be included in the radio access network 100.

Defining a Non-Circular Paging Area for a Sector

Each radio node 104a-104c serves one or more sectors and communicates with multiple access terminals in its cell. For each sector, the network 100 defines a set of Route Update Protocol parameters that includes a [Xi] value within a longitude parameter, a [Yi] value within a latitude parameter, and a [Ri] value within a RouteUpdateRadius parameter. Each of the values [Xi, Yi, Ri] are expressed in units of degrees. The [Xi, Yi] values for each sector represent the longitude co-ordinate and the latitude co-ordinate of the sector. When distance-based location updating is enabled by the network 100, the [Ri] value represents the distance from the sector that an access terminal can travel from before triggering a new route update message to the network 100.

Figure 2:
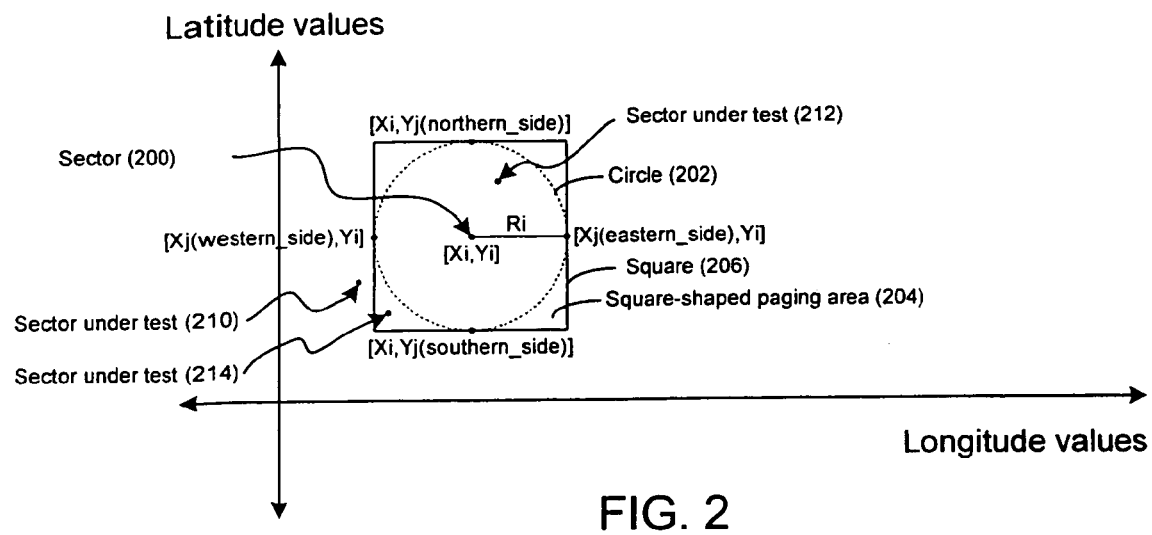
FIG. 2 shows a square-shaped paging area on a map projection of the surface of the earth.

The network 100 uses the three values [Xi, Yi, Ri] of a sector 200 to define its non-circular paging area. In some implementations, the network defines a square-shaped paging area 204 that encloses a circle 202 having a radius [Ri] and a center at [Xi, Yi] co-ordinates as shown in FIG. 2. The square-shaped paging area 204 is depicted as a square 206 on a map projection of the earth's surface, where the horizontal axis represents longitude values and the vertical axis represents latitude values. Each latitude value represents a distance, in degrees, north (positive latitude values) or south (negative latitude values) of the Equator. Lines of latitude along the latitude axis of the earth are parallel to and equidistance from one another. Each longitude value represents a distance, in degrees, east (positive longitude values) or west (negative longitude values) of the Prime Meridian. Lines of longitude along the longitude axis of the earth are not parallel, but converge at the poles in order to account for the curvature of the earth's surface. Because of this convergence, the distance between the lines of longitude varies based on latitude, from about 112 km at the Equator to about zero at the poles.

The square-shaped paging area 204 has a center at [Xi, Yi] co-ordinates and sides along the lines of longitude and latitude. These sides are referred to as northern, southern, eastern, or western sides based on the position of the side relative to the center at [Xi, Yi] co-ordinates. The network 100 identifies the northern and southern sides along the lines of latitude by [Xi, Yj] co-ordinates corresponding to points where the circle 202 touches the square 206 directly due north and south of the center at [Xi, Yi] co-ordinates. Similarly, the network 100 identifies the eastern and western sides along the lines of longitude by [Xj, Yi] co-ordinates corresponding to points where the circle touches the square 206 directly due east and west of the center at [Xi, Yi] co-ordinates.

Although the square-shaped paging area 204 is visually depicted in FIG. 2 as having eastern and western sides that are of length 2*Ri, the absolute lengths of these sides are greater than 2*Ri and are not perfectly parallel to each other to take into consideration the earth's curvature. As the values of [Xi, Yi, Ri] are expressed in units of degrees, the calculations used to derive the co-ordinates of the corners of the square-shaped paging area 204 account for the fact that the distance between lines of longitude vary linearly with the cosine of the latitude. As an example, the value of [Xj] on the eastern side of the square-shaped paging area 204 can be calculated using Xj=Xi+Ri/cos(Yi) in instances in which the square-shaped paging area 204 does not straddle the Prime Meridian (longitude numbering wraps around at the Prime Meridian and would therefore need to be accounted for). The [Yj] terms do not need such adjustments since parallels of latitude are considered to be equidistant. As an example, the value of [Yj] on the northern side can be calculated using Yj=Yi+Ri in instance in which the square-shaped paging area 204 does not cover one of the poles of the earth.

The information defining the square-shaped paging area of each sector is stored by the network 100 in a data store for subsequent use in selectively paging an access terminal.

Paging an Access Terminal

When a packet destined for an access terminal 112 is received at the packet data serving node 108, the packet is forwarded to the radio node controller ("serving radio node controller" 102) on which a 1xEV-DO session of the access terminal 112 resides. The serving radio node controller 102 selects a set of sectors on which the access terminal 112 is to be paged, and sends a paging message to the selected sectors. In the examples to follow, the serving radio node controller 102 selects a subset of the sectors in accordance with a selective paging technique.

The serving radio node controller 102 first identifies the sectors over which the access terminal 112 last sent a message ("route update message") to update the network 100 of the access terminal's current location. In some instances, only one sector is identified and that sector is designated as a paging reference sector. In other instances, multiple sectors are identified and all of those sectors are designated as paging reference sectors.

In the case of a single paging reference sector, the serving radio node controller 102 retrieves, from the data store, the information defining the square-shaped paging area of the paging reference sector. The serving radio node controller 102 then performs a series of comparisons to identify a set of sectors that is located within the square-shaped paging area of the paging reference sector. In one implementation, the network 100 maintains a list of sector information for the network. The sector information includes the longitude and latitude co-ordinates for each sector in the network. The sector information can be ordered, sorted, or grouped along pairs of longitude and latitude values to enable comparison operations to be performed quickly.

To identify those sectors that are located within the square-shaped paging area, the serving radio node controller 102 compares the [Xt, Yt] co-ordinates of each sector ("sector under test") with the [Yj] co-ordinates of the northern and southern sides and [Xj] co-ordinates of the eastern and western sides of the square-shaped paging area. In some implementations, if [Xj(western_side)≦Xt≦Xj(eastern_side), Yj(northern_side)≦Yt≦Yj(southern_side)], the sector under test is identified as being within the square-shaped paging area of the paging reference sector.

Suppose there are three sectors for which sector information is provided in the list. The three sectors are depicted in the example of FIG. 2 as sectors 210, 212, and 214. A comparison of the [Xt, Yt] co ordinates of each sector 210, 212, and 214 with the [Yj] co-ordinates of the northern and southern sides and [Xj] co-ordinates of the eastern and western sides of the square-shaped paging area 204 reveals that two of the sectors 212 and 214 are within the square-shaped paging area 204, while the sector 210 is outside the square-shaped paging area 204. Subsequently, the serving radio node controller 102 sends (210) a paging message to each sector 212 and 214 that is within the square-shaped paging area 204 to selectively page the access terminal 112 for an incoming call.

The above description corresponding to FIG. 2 relates to selective paging techniques related to a single paging reference sector. The techniques are also applicable in the scenario in which multiple paging reference sectors are identified.

Figure 3:
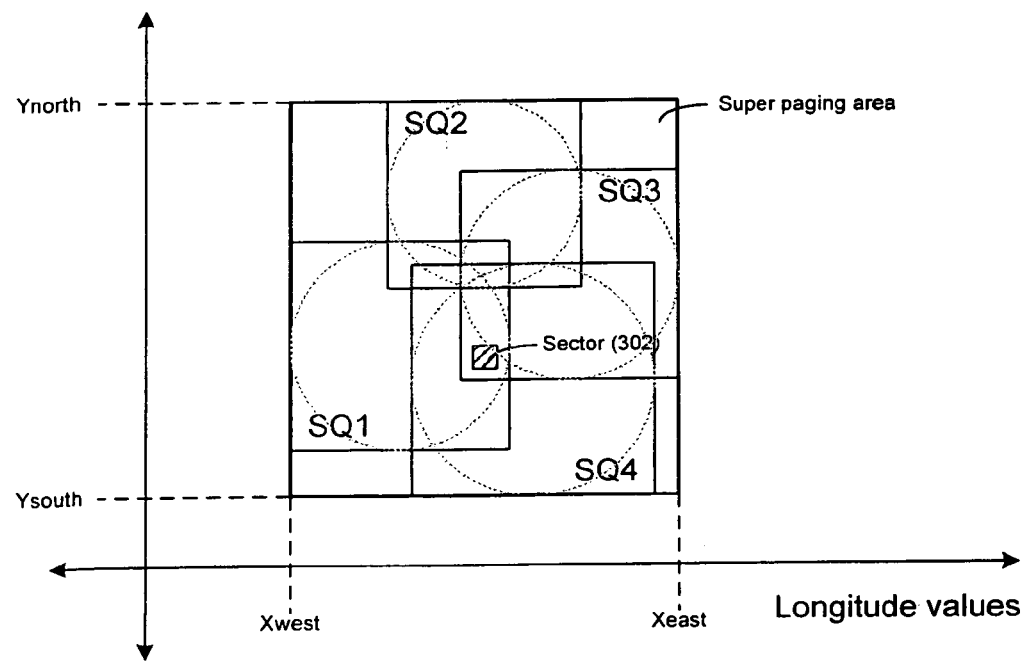
FIG. 3 shows a super paging area on a map projection of the surface of the earth.

In the case of multiple paging reference sectors, the serving radio node controller 102 retrieves, from the data store, the information defining the square-shaped paging area of each paging reference sector. Four square-shaped paging areas (SQ1, SQ2, SQ3, and SQ4) are depicted in FIG. 3. The square-shaped paging areas (SQ1, SQ2, SQ3, and SQ4) can be of different sizes depending on the [Ri] value of respective paging reference sectors. Although all four of the square-shaped paging areas (SQ1, SQ2, SQ3, and SQ4) overlap each other by varying amounts, there are instances in which one or more of the square-shaped paging areas does not overlap any of the other square-shaped paging areas. As can be seen from FIG. 3, a sector 302 that is within the SQ1 paging area can also be within the SQ3 and SQ4 paging areas. If provisions are not made to eliminate multiple pagings by a single sector, an access terminal 112 may be paged three times by the sector 302.

To avoid such a scenario, the radio node controller defines a non-circular paging area ("non-circular super paging area") that encompasses the four square-shaped paging areas (SQ1, SQ2, SQ3, and SQ4). To do so, the serving radio node controller 102 performs a series of comparisons between the square-shaped paging areas (SQ1, SQ2, SQ3, and SQ4) to identify latitude and longitude values corresponding to the northernmost, southernmost, easternmost, and westernmost points among all of the square-shaped paging areas (SQ1, SQ2, SQ3, and SQ4). For example, the serving radio node controller 102 compares the northern sides of the square-shaped paging areas (SQ1, SQ2, SQ3, and SQ4) against each other to identify the northernmost [Ynorth] co-ordinate, which is then used to designate as the northern side of the super paging area. Similar comparisons are done for each of the other sides to obtain [Ysouth] co-ordinate, [Xeast] co-ordinate and [Xwest] co-ordinate. The super paging area that results from these comparisons may be square-shaped or rectangular-shaped, where the sides of the super paging area are parallel to the longitude axis or lateral axis of the earth as appropriate.

Once the super paging area is defined, the serving radio node controller 102 can easily and quickly identify a set of sectors that is located within the super paging area of the multiple paging reference sectors in a manner similar to that described above with respect to the single paging reference sector example. Specifically, a series of comparisons of the [Xt, Yt] co ordinates of each sector under test with the [Ynorth] and [Ysouth] co-ordinates of the northern and southern sides, respectively, and [Xeast] and [Xwest] co-ordinates of the eastern and western sides, respectively, of the super paging area can be performed. In some implementations, if [Xwest≦Xt≦Xeast, Ynorth≦Yt≦Ysouth], the sector under test is identified as being within the super paging area of the multiple paging reference sectors. Subsequently, the serving radio node controller 102 sends a paging message to each sector that is identified as being located within the non-circular super paging area of the multiple paging reference sectors to selectively page the access terminal 112 for an incoming call.

The techniques described above in relation to FIGS. 1 to 3 provide a dynamic and efficient way in which sectors on which an access terminal 112 is to be paged can be selected at the time of paging. In some implementation, the techniques are further enhanced by allowing a network operator to increase the page success probability by adding, multiplying, or otherwise increasing the [Ri] value within a RouteUpdateRadius parameter of a given sector by a tunable factor. This results in an increase in size of the non-circular paging area associated with the given sector, which in turn ensures a high page success rate for access terminals at the boundary of the circle having a radius corresponding to the RouteUpdateRadius parameter.

Although the techniques described above employ the 1xEV-DO air interface standard, the techniques are also applicable to other CDMA and non-CDMA air interface technologies in which the distance-based updating of an access terminal's location within a network is enabled.

The techniques described above can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention, and, accordingly, other embodiments are within the scope of the following claims.

What is claimed is:

1. A method performed by a radio node controller in a radio access network, the method comprising:

retrieving information defining a non-circular paging area for a paging reference sector, the information being based on second information associated with the paging reference sector; and identifying one or more sectors of the radio access network overlapping the non-circular paging area from which an access terminal is to be paged.

2. The method of claim 1, wherein the second information comprises:

a location value and a distance value associated with the paging reference sector.

3. The method of claim 2, wherein the non-circular paging area encompasses at least a circle having a center corresponding to the location value and a radius corresponding to the distance value.

4. The method of claim 2, wherein the location value comprises a longitude co-ordinate and a latitude co-ordinate associated with the paging reference sector.

5. The method of claim 2, wherein the distance value represents a distance from the location value.

6. The method of claim 2, wherein the non-circular paging area has a size that is based on the distance value associated with the paging reference sector.

7. The method of claim 1, further comprising:

receiving a route update message from the access terminal; and based on the route update message, designating a sector of the radio access network as being the paging reference sector.

8. The method of claim 7, wherein the information is retrieved from a data store.

9. The method of claim 7, further comprising:

sending a paging message to each of the one or more sectors overlapping the non-circular paging area so as to initiate a page of the access terminal by each of the one or more sectors, wherein each of the one or more sectors has a corresponding longitude co-ordinate, a corresponding latitude co-ordinate, and a corresponding portion of coverage area that overlaps with the non-circular paging area; and wherein for each of the one or more sectors, the corresponding longitude and latitude co-ordinates are within the non-circular paging area.

10. The method of claim 1, further comprising:

maintaining location value information for sectors of the radio access network.

11. The method of claim 10, wherein the maintaining comprises:

maintaining an ordered list in which the location value information for the sectors are ordered along longitude and latitude values.

12. The method of claim 1, further comprising:

receiving a route update message from the access terminal; and based on the route update message, designating sectors of the radio access network as being the corresponding paging reference sectors.

13. The method of claim 12, wherein the information is retrieved from a data store; and wherein generating the non-circular super paging area comprises: generating the non-circular super paging area using the information.

14. The method of claim 13, further comprising:

sending a paging message to each of the one or more sectors overlapping the non-circular super paging area so as to initiate a page of the access terminal by each of the one or more sectors, wherein each of the one or more sectors has a corresponding longitude co-ordinate, a corresponding latitude co-ordinate, and a corresponding portion of coverage area that overlaps with the non-circular super paging area; and wherein for each of the one or more sectors, the corresponding longitude and latitude co-ordinates are within the non-circular paging area.

15. The method of claim 1, wherein the information defining the non-circular paging area comprises a set of values, each value representing a side of the non-circular paging area.

16. The method of claim 1, wherein the non-circular paging area comprises a square-shaped paging area.

17. The method of claim 1, wherein the information defining the non-circular paging area is determined based on a curvature of the surface of the earth.

18. A computer-readable medium that stores executable instructions for use at a radio node controller of a radio access network, the instructions for causing the radio node controller to:

retrieve information defining a non-circular paging area for a paging reference sector, the information being based on second information associated with the paging reference sector; and identify one or more sectors of the radio access network overlapping the non-circular paging area from which an access terminal is to be paged.

19. The computer-readable medium of claim 18, further comprising instructions to cause the machine to:

designate a sector of the radio access network as being the paging reference sector based on a route update message received from the access terminal; and send a paging message to each of the one or more sectors overlapping the non-circular paging area so as to initiate a page of the access terminal by each of the one or more sectors, wherein each of the one or more sectors has a corresponding longitude co-ordinate, a corresponding latitude co-ordinate, and a corresponding portion of coverage area that overlaps with the non-circular paging area; and wherein for each of the one or more sectors, the corresponding longitude and latitude co-ordinates are within the non-circular paging area.

20. A method performed by a radio network controller in a radio access network, the method comprising:

selecting sectors as lying within a non-circular paging area for a paging reference sector when an incoming call is detected; and paging an access terminal from the radio access network in the sectors.

21. A method performed by a radio network controller in a radio access network, the method comprising:

identifying sectors and designating the sectors as paging reference sectors;

defining a non-circular super paging area to encompass non-circular paging areas corresponding to the paging reference sectors;

selecting a first set of sectors overlapping the non-circular super paging area when an incoming call is detected by comparing positional values of a second set of sectors with boundaries of the non-circular super paging area, the second set of sectors comprising at least the first set of sectors; and paging the access terminal from the first set of sectors.

22. A radio access network comprising a packet data serving node, a radio node controller and at least one radio node, said radio access network configured to:

receive, from an access terminal, a route update message;

designate a paging reference sector based on the received message;

retrieve information defining a non-circular paging area of the paging reference sector;
identify one or more sectors that overlap the non-circular paging area; and
page the access terminal from the one or more sectors when an incoming call is detected at the packet data serving node.

23. The method of claim 1, further comprising:
retrieving additional information defining additional non-circular paging areas for additional corresponding paging reference sectors, the information being based on additional second information respectively associated with the additional corresponding paging reference sectors; and
identifying, for each of the additional non-circular paging areas, one or more additional sectors of the radio access network overlapping the additional non-circular paging area from which the access terminal is to be paged.

24. A method performed by a radio node controller in a radio access network, the method comprising:
retrieving information defining non-circular paging areas for corresponding paging reference sectors, the information being based on corresponding second information respectively associated with the corresponding paging reference sectors;
generating a non-circular super paging area of the corresponding paging reference sectors, the non-circular super paging area comprising a union of the non-circular paging areas; and
identifying one or more sectors of the radio access network overlapping the non-circular super paging area from which an access terminal is to be paged.

25. The method of claim 24, wherein the information defining the non-circular paging areas comprises corresponding sets of values, wherein for each non-circular paging area, each value of the corresponding set of values represents a side of the non-circular super paging area.

26. The method of claim 24, wherein the non-circular super paging area comprises a square-shaped super paging area.

27. The method of claim 24, wherein the non-circular super paging area comprises a rectangular-shaped super paging area.

28. The method of claim 24, wherein the information defining the non-circular paging areas is determined based on a curvature of the surface of the earth.

29. The method of claim 7, wherein the route update message is received from the access terminal via a packet data serving node.

30. The method of claim 12, wherein the route update message is received from the access terminal via a packet data serving node.

31. The method of claim 21, wherein the non-circular paging areas are defined by information, the information being determined based on second information respectively associated with the paging reference sectors.

* * * * *